Jan. 15, 1963     E. W. BERGSTROM, JR     3,073,613
PALLET COUPLER
Filed May 31, 1961

INVENTOR.
ERICK W. BERGSTROM JR.
BY
Ezekiel Wolf, Wolf + Greenfield

ATTORNEYS

United States Patent Office 3,073,613
Patented Jan. 15, 1963

3,073,613
PALLET COUPLER
Erick W. Bergstrom, Jr., 3 Edith St., Arlington, Mass.
Filed May 31, 1961, Ser. No. 113,924
2 Claims. (Cl. 280—24)

This invention relates to devices for moving pallets and more particularly comprises a coupling device for connecting a chain or line to a pallet.

Before fork lift trucks can be used to transport pallets from one location to another it is necessary that the pallets be moved to a position accessible to the fork lift truck. It is often impossible for a fork lift truck to enter a trailer to pick up a loaded pallet positioned at a spot remote from the trailer door. In such cases the operator of the lift truck must find some means for moving the loaded pallet to the door of the trailer where the fork lift may engage the pallet to carry it to the desired location. Ordinarily the operator uses a chain connected at one end to the lift truck and having a hook at the other end which bites into the pallet wood to engage the pallet, and backs up the truck to pull the pallet to the trailer door. All the expedients now available for connecting the chain to the pallet seriously mar and weaken the pallet and thus shorten its life.

The primary object of my invention is to provide a simple and inexpensive coupling device which facilitates connecting a chain or line to a pallet.

Another important object of my invention is to provide a device for coupling a chain or line to a pallet, which may be readily secured to and removed from the pallet without tightening or loosening bolts, clamps or other types of fasteners.

To accomplish these and other objects my coupling device includes among its features a pair of parallel arms which are provided at adjacent ends with flanges designed to engage the side of a horizontal plank that forms part of one of the surfaces of the pallet. The separated arms are adapted to engage the side of the horizontal plank at spaced locations so that the pallet will slide translationally on the plane upon which it rests without twisting or turning. The parallel arms are connected together at their other ends to form a generally U-shaped member, and the connection between the arms carries a hook which may readily engage a link of a chain or be looped by a line. The coupling device may be slipped on and off the pallet without loosening any form of fastening device and without moving or lifting the pallet.

These and other objects and features of my invention along with its incident advantages will be better understood and appreciated from the following detailed description of one embodiment thereof, selected for purposes of illustration and shown in the accompanying drawing, in which.

Figure 1:
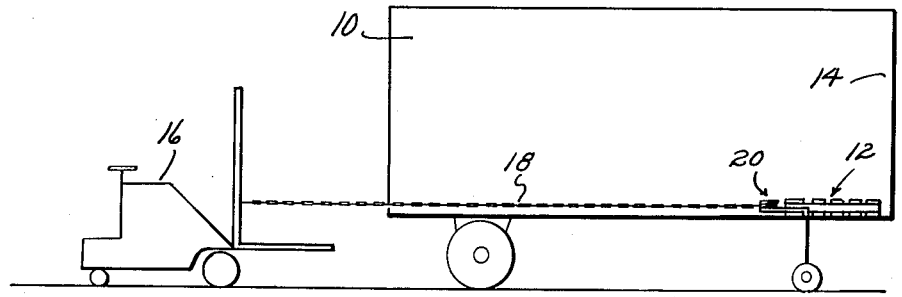
FIG. 1 is a side view of a trailer within which is stored a pallet in turn connected to a fork lift truck by a coupling device embodying my invention.

In FIG. 1 a trailer 10 is shown to house a conventional loaded pallet 12 at its forward closed end 14. Disposed outside the trailer 10 adjacent its open end is a fork lift truck 16 conventionally designed and used to transport pallets of the type in the trailer. It is apparent from an inspection of FIG. 1 that before the fork lift truck 16 can transport the pallet 12 from the trailer 10 to some other location the pallet must be moved to the open end of the trailer 10 where it is accessible to the truck 16. In FIG. 1 the lift truck 16 is shown connected by a chain 18 and a coupling device 20 to the pallet. By backing the truck away from the open end of the trailer it drags the pallet to the open end of the trailer where it may then be engaged by the fork of the truck and carried away.

Figure 2:
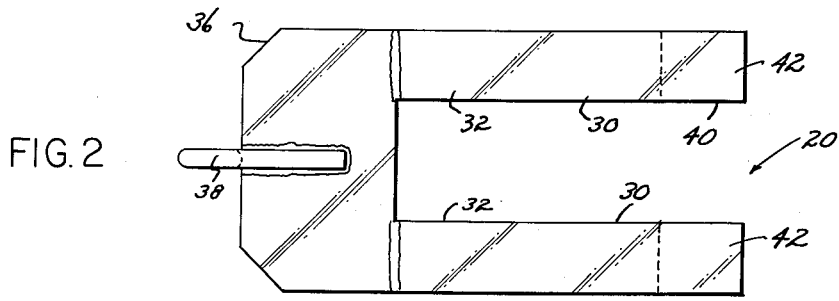
FIG. 2 is a plan view of a coupling device shown in FIG. 1.
Figure 3:
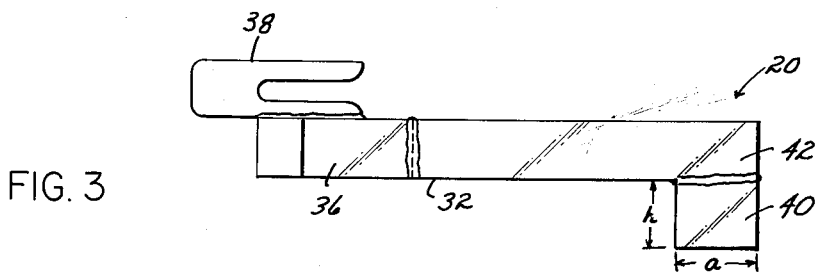
FIG. 3 is a side view of the coupling device shown in FIG. 2.
Figure 4:
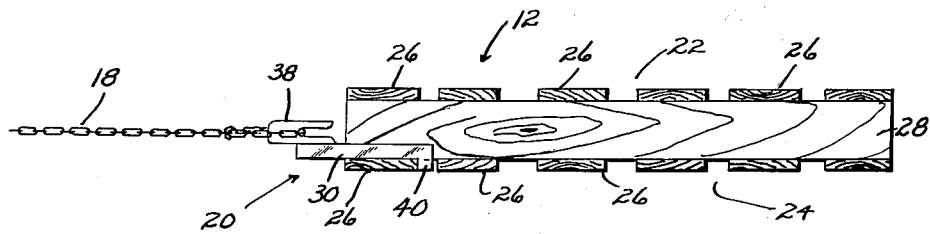
FIG. 4 is a side view partly in section of a pallet engaged by a coupling device embodying my invention.

The coupling device 20 which enables the chain 18 to be readily connected to the pallet is shown in detail in FIGS. 2 and 3. In FIG. 4 the pallet is shown in detail. The pallet 12 shown in detail in FIG. 4 is composed of upper and lower horizontal panels 22 and 24 each composed of a number of spaced, parallel boards or planks 26 nailed or otherwise secured to ribs 28, one of which is shown. Ordinarily three ribs 28 are employed, one at each side of the pallet adjacent the ends of the horizontal spaced boards 26 and one intermediate the ends of the boards.

The coupling device 20 includes a pair of spaced parallel arms 30 each welded at its forward end 32 to cross member 36. Secured to the upper surface of the cross member 36 is a hook 38 open rearwardly and sized to engage a link in a chain or have a line looped about it. Downwardly extending flanges 40 are welded to the bottom of the ends 42 of the arms and complete the coupling device structure.

As is evident in FIG. 4 the downwardly extending flanges 40 formed on the rearward ends of the arms 30 are adapted to engage the trailing side of the first horizontal board or plank in the lower panel 24 of the pallet. The arms 30 are spaced apart a distance adequate to straddle the middle rib 28 so that the flanges 40 on the ends of the arms engage the first board 26 on opposite sides of the rib. Thus, when the chain 18 looped over the hook 38 is pulled, the coupling device remains in engagement with the pallet 12 and pulls the pallet on the supporting surface (in FIG. 1 the bed of the trailer) in the direction in which the chain is pulled.

Some typical dimensions of the coupling device will afford the reader a better appreciation of my invention. Each of the arms may be 8″ long and be made of stock 2″ x ⅜″ in cross section. To enable the arms to span the ribs, they should be approximately 4″ apart. The downwardly extending flanges 40 may have a length dimension "a" of ¾″ and a height h of the same size. The length a of the flange is of course limited by the space between adjacent boards of the pallet. Similarly, to insure continued engagement of the flanges 40 with the trailing side of the boards the height h of the flanges should not exceed the thickness of the boards. If the flanges exceed the thickness of the boards the lower edge of the flanges would ride on the surface supporting the pallet and any irregularity in that surface could cause the coupling device to bounce between the panels of the pallet and disengage the boards. While the dimensions given are suggested as being suitable for use with most if not all pallets now in use, it is to be understood that these dimensions may change if the size of stock normally used in pallets changes or should it prove desirable to engage other than the first horizontal board in the lower panel of pallets.

It will readily be appreciated that by the use of the coupling device 20 the fork lift operator may quickly connect a chain to a pallet which must be moved without mutilating the pallet by digging into its wooden members, or lifting the pallet, or subjecting the pallet to any undue strain. The ease with which the coupling device may be connected to the pallet does away with any loss of time. After the pallet is moved to an accessible location, the coupling device may readily be lifted from the position shown in FIG. 4 to disengage the flanges 40 from the trailing side of the first board 26. After disengaging the chain from the pallet the operator may immediately lift the pallet with the fork and take it to the desired location.

From the foregoing description those skilled in the art will appreciate that numerous modifications may be made of my invention without departing from its spirit. Therefore, I do not intend to limit the breadth of my invention to the specific embodiment illustrated and described. Rather, it is my intention that the breadth of this invention be determined by the appended claims and their equivalents.

What is claimed is:

1. A device adapted to connect a chain or line to a pallet having upper and lower horizontal panels separated by ribs and each made up of spaced horizontal members comprising a pair of parallel arms adapted to lie between the panels on opposite sides of a rib, a cross member interconnecting the arms at one end and carrying a hook adapted to engage a chain or line, and a flange secured to and extending downwardly on the other ends of each of the arms and adapted to engage one of said spaced members.

2. In combination with a pallet having upper and lower horizontal panels separated by ribs and each made up of spaced horizontal members, a pallet coupler comprising a pair of parallel arms spaced apart a distance exceeding the width of the ribs and straddling a rib, means including a hook joining the arms at one end and with the hook disposed above the plane of the parallel arms, and downwardly extending flanges secured to the other ends of the arms and each having a combined height with its reflective arm less than the space between the upper and lower panels, said flanges engaging the side edge of a horizontal member in the lower panel.

References Cited in the file of this patent

UNITED STATES PATENTS

| | | |
|---|---|---|
| 366,813 | Brown | July 19, 1887 |
| 594,644 | McCorklie | Nov. 30, 1897 |
| 691,081 | Strok et al. | Jan. 14, 1902 |
| 851,732 | Deschambault | Apr. 30, 1907 |
| 1,940,242 | Burgess | Dec. 19, 1933 |
| 2,420,001 | McCollom | May 6, 1947 |
| 2,690,926 | Betz | Oct. 5, 1954 |
| 2,764,447 | Schmidt | Sept. 25, 1956 |
| 2,847,243 | Hare | Aug. 12, 1958 |